United States Patent [19]
Pfeiffer et al.

[11] Patent Number: 5,740,365
[45] Date of Patent: Apr. 14, 1998

[54] PERSONAL SERVICE COMPUTER DIRECTLY CONNECTED TO COMMUNICATION SYSTEMS HAVING PROGRAM STRUCTURE FOR GENERATING ADMINISTRATION AND MAINTENANCE INSTRUCTIONS AND COMMUNICATING THOSE INSTRUCTIONS TO RESPECTIVE COMMUNICATION SYSTEM

[75] Inventors: Andreas Pfeiffer; Wolfgang Kaufel; Christine Vogt-Wingerath; Frank Renner; Michael Kreutzer; Manfred Weiser, all of Berlin, Germany

[73] Assignee: Siemens Aktiengesellschaft, Munich, Germany

[21] Appl. No.: 447,951

[22] Filed: May 23, 1995

[30] Foreign Application Priority Data

May 25, 1994 [DE] Germany .................. 44 18 231.7

[51] Int. Cl.⁶ .................................................. G06F 9/00
[52] U.S. Cl. ................... 395/200.11; 395/712; 395/333
[58] Field of Search ......................... 364/200, 900; 395/200.11, 250, 600, 333, 712

[56] References Cited

U.S. PATENT DOCUMENTS

| | | | |
|---|---|---|---|
| 5,018,097 | 5/1991 | Kuhlmann et al. | 364/900 |
| 5,047,923 | 9/1991 | Elstner et al. | 364/200 |
| 5,412,781 | 5/1995 | Lukas et al. | 395/250 |
| 5,454,078 | 9/1995 | Heimsoth et al. | 395/200.1 |
| 5,560,004 | 9/1996 | Weng et al. | 395/600 |

OTHER PUBLICATIONS

ISDN in the Office-HICOM — Special Issue telcom report and Siemens Magazine COM, Dec. 1985.

*Primary Examiner*—Thomas C. Lee
*Assistant Examiner*—David Ton
*Attorney, Agent, or Firm*—Hill, Steadman & Simpson

[57] ABSTRACT

For administering and maintaining a greatest variety of communication systems having a greatest variety of configuration levels and function versions, a modularly structured personal service computer can be connected thereto locally or via communication networks. The adaptability to the greatest variety of communication systems is achieved with the assistance of a software concept wherein administration and maintenance instructions that administer and maintain communication systems are generated individually associated to a communication system and under the control of the user surface and are communicated to the respective communication system. The software concept is based on a software structure comprising four program structures that can be modified by removing or adding program modules given the least influencing of the implemented program modules and that substantially enhances the modularity and adaptability of the personal service computer.

15 Claims, 5 Drawing Sheets

PERSONAL SERVICE COMPUTER DIRECTLY CONNECTED TO COMMUNICATION SYSTEMS HAVING PROGRAM STRUCTURE FOR GENERATING ADMINISTRATION AND MAINTENANCE INSTRUCTIONS AND COMMUNICATING THOSE INSTRUCTIONS TO RESPECTIVE COMMUNICATION SYSTEM

RELATED APPLICATION

The present case is related to copending application Hill Firm Case No. P95,1019 entitled "METHOD AND PERSONAL SERVICE COMPUTER FOR THE ADMINISTRATION AND MAINTENANCE OF COMMUNICATION SYSTEMS", inventors Andreas Pfeiffer et al.

BACKGROUND OF THE INVENTION

Digital communication systems, particularly digital switching systems, serve the purpose of connecting communication terminal equipment having versatile performance features to one another and of connecting these terminal equipment to private or public communication networks. For this purpose, the communication systems are equipped with extensive switching-oriented, administration and maintenance and dependability program modules. Such a communication system is known, for example, from the publication of Siemens AG, "ISDN im Buero, HICOM", reprint from *Telcom Report* and *Siemens-Magazin COM* (1985). An administration and maintenance terminal to which a service terminal is connected is provided for the operation, the maintenance and for the administration or management of such a communication system. A service terminal comprises, for example, a picture screen unit having an alphanumerical keyboard and a printer as well as a CCITT man-machine language. Personal computers are preferably provided for the realization of comfortable user surfaces for administration and maintenance terminals, for example with mask and window technology.

The known communication system is operated, administered and maintained with the assistance of administration and maintenance instructions. The administration and maintenance instructions formed or stored in the administration and maintenance terminal proceed to the communication system via the administration and maintenance terminal. The administration and maintenance instructions are processed therein, i.e. the indicated administration and maintenance jobs are performed. For the implementation of procedures related to user jobs such as, for example, establishing a subscriber terminal, the administration and maintenance instructions required for this purpose are combined to form a stack and are stored in the administration and maintenance terminal. Administration and maintenance parameters, with whose assistance a designational management, operation and administration of a communication system are possible, can be inserted into the administration and maintenance instructions with inputs at the service terminal controlled by the user surface. In addition to the ISDN communication system set forth at the outset, other communication systems HICOM of Siemens AG can be administered, operated and managed with such administration and maintenance instructions. In particular, different administration and maintenance instructions or parameters and different user job-related stacks of administration and maintenance instructions as well as their effects in the respective communication systems must thereby be taken into consideration for the individual communication systems. Consequently, a specifically tailored administration and maintenance terminal was realized for each of the communication systems. This means that different administration and maintenance terminals are designed for the maintenance and configuring or administration of different communication systems. This differing design of administration and maintenance terminals also applies to the remote administration and remote maintenance of communication systems, whereby the greatest variety of administration and maintenance interfaces are designed for the connection of the communication systems to public or private communication networks.

SUMMARY OF THE INVENTION

It is an object of the invention to provide an administration and maintenance terminal for local and remote maintenance as well as remote administration of different communication systems.

According to the present invention, a personal service computer is provided having at least one asynchronous communication interface and a personal computer operating system as well as a window-oriented operating system. The personal service computer is connected locally or remotely to communication systems for the purpose of an administration and maintenance of these communication systems. The communication systems are administered and maintained by administration and maintenance instructions that contain administration and maintenance parameters. A user program structure is provided formed by user program modules for generating and visualizing administration and maintenance parameters initializable and controllable by user surfaces as well as administration and maintenance instructions, and for also initializing and controlling communication to and from a communication system. A visualization program structure is formed by program modules for displaying communication system errors and messages. An administration and maintenance program structure is provided wherein an instruction-processing program module is designed such that:

administration and maintenance parameters communicated from the user program modules can be inserted into administration and maintenance instructions, and administration and maintenance parameters and information can be read from the administration and maintenance instructions communicated from the communication systems and can be transferred to the user program modules;

a communication of every administration and maintenance instruction to and from the communication system is controlled and monitored; and an administration and maintenance information received from a communication system as a reaction to an administration and maintenance instruction that was transmitted is evaluated and a corresponding or no corresponding administration and maintenance reaction is indicated, dependent on the informational content. An access program module controls and monitors the communication with the communication system via the communication interface. A communication interface program module procedurally controls a communication interface realized in the window-oriented operating system. A circuit-oriented program structure is provided having at least one asynchronous communication interface driver realized in the window-oriented operating system or personal computer operating system.

An important aspect of the personal service computer may be seen in the program structuring and in the designing of the individual program structures with which a considerable enhancement of the modularity in the programming and of the portability of the personal service computer are achieved for different communication systems to be administered and to be managed. This means that, given a later addition of new communication systems or new configuration versions of such communication systems or the appearance of new communication services, both the administration as well as the maintenance of the communication systems can be governed by attaching new program modules, especially device program modules and application program modules. In all respects, thus, the personal service computer of the invention offers a pronounced adaptability to different communication systems with the greatest range of embodiments without objective influencing of the program structures realized in the personal service computer or of the system concept underlying this system structure.

The modularity or portability of the personal service computer is essentially effected by a system concept divided into four program structures. The four program structures represent the user program structure, the visualization program structure, the administration and maintenance program structure and the circuit-oriented program structure. The functions relating to the formation and communicating of administration and maintenance instructions from and to the communication systems are thereby effected with the assistance of the instruction processing program module realized in the administration and maintenance program structure. The access to the instruction processing program module and to the communication system is controlled by the access program module. Additionally, the activation of one of the two operating systems dependent on the realized linking of the respective user program module occurs with this access program module. As a result of the insertion of a visualization program structure, a decoupling of the error and system messages communication from the communication systems from the administration and maintenance instruction traffic is effected. These transmitted error and system messages are visualized in the personal service computer without further processing.

User program modules or circuit-oriented program modules can be inserted to or removed from the user program structure and the circuit-oriented program structure with little additional expense. The access program module is to be informed of these modifications on the basis of corresponding, administration and maintenance inputs for the purpose of an additional control of additional program modules or the removal of program modules.

According to an advantageous development of the personal service computer of the invention, this is designed such that administration and maintenance instructions combined to stacks that are individually associated to a communication system or are job-related are successively communicated to a communication system. This means that job-related stacks of administration and maintenance instructions—for example, "establish a subscriber"—are stored in a bulk storage—for example, a hard disk—allocated to the instruction-processing program module and are automatically successively communicated by the instruction-processing program module by instruction to a communication system to be administered or managed. In the successive communication, a wait is carried out after every communication of an administration and maintenance instruction for an acknowledge message and this is interpreted, whereby the result of the interpretation influences further execution such that, after recognition of an execute acknowledge of the administration and maintenance instruction previously communicated, a further, existing administration and maintenance is communicated and, given a recognition of a non-executed acknowledge of the previously communicated administration and maintenance instruction, a reaction corresponding to the respective requirement is initiated. For example, a current user program module is informed of the non-acknowledge and, together with this, a further administration and maintenance instruction enabling the execution of the corresponding administration and maintenance instruction is formed and communicated to the affected communication system. An automatic formation of a further, additional administration and maintenance instruction, for example, and a communication thereof to the affected communication system, is provided as a further reaction.

Alternatively, job-related stacks of administration and maintenance instructions can be formed in the user program modules and can be given to the instruction-processing program module for the purpose of forwarding to a communication system. This means that both individual administration and maintenance instructions as well as stacks of administration and maintenance instructions can be formed in the user program modules, whereby existing stacks stored in bulk storages represent the basis for the formation of stacks, these stored stacks being compiled to form current stacks of administration and maintenance instructions by inputting parameters controlled by the user surface.

An administration program module, a maintenance program module and a communication program module are especially advantageously provided in the user program structure. These user program modules can be realized both in the personal computer operating system as well as in a window-oriented operating system. For example, the operating system MS-DOS represents an advantageous personal computer operating system, and, for example, a "MS WINDOWS" operating system represents an advantageous window-oriented operating system.

In addition, a database program module that generates or updates a database of a communication system or that collects database data can be inserted into the user program structure. The database of a communication system to be administered or managed can be produced with the assistance of this database program module. The personal service computer is equipped with a peripheral computer interface for transferring the mainly extensive database data from the personal service computer to a communication system and vice versa. For the realization of this peripheral computer interface, a computer interface program module is provided in the administration and maintenance program module and a computer interface driver is provided in the circuit-oriented program structure. The peripheral computer interface is advantageously realized by the standardized SCSI computer interface (Small Computer System Interface). The peripheral SCSI computer interface standardized in the Standard ANSI (American National Standard Institute) X3T9.2 is particularly defined for the connection of peripheral equipment—for example, mass storages—to smaller computer systems. For the bidirectional transmission of addresses and data, this peripheral computer interface is equipped with eight data interface terminals and a data parity bit interface terminal. Another nine control terminals are provided for the control of the periphery interface. As a result of the realization of this peripheral computer interface, extensive database information given a local connection of the personal service computer can be communicated to a communication system, for example extensive database information can be directly communicated into the bulk storage—for example, hard disk—of the communication system. Analogous thereto, one or more datafiles from the database of the communication system can be directly called from the periphery memory of the communication system and can be transmitted to the service personal computer.

For the coupling of personal service computers, for example given remote administration or maintenance of a communication system, or for the coupling of a service personal computer to a data processing system, an external communication program module is provided in the user program module and a synchronous communication interface driver is provided in the circuit-oriented program structure. The communication interface driver represents the link to a synchronous communication interface. With the assistance of this synchronous communication interface to be optionally realized, bulk data can be transmitted from or to a communication system or a data processing system for the purpose of an extensive database updating or database production. Stacks of administration and maintenance instructions can also be communicated via this further synchronous communication interface. The procedural control of this further synchronous communication interface is realized by the external communication program module realized in the user program structure.

According to another advantageous development of the personal service computer, a help program module can be inserted in the user program structure. Information that support or explain the operation of a personal service computer can be shown to an unexperienced service person with the assistance of this help program module.

The personal service computer of the invention shall be set forth in greater detail below with reference to a number of block circuit diagrams.

DESCRIPTION OF THE PREFERRED EMBODIMENTS

Figure 1:
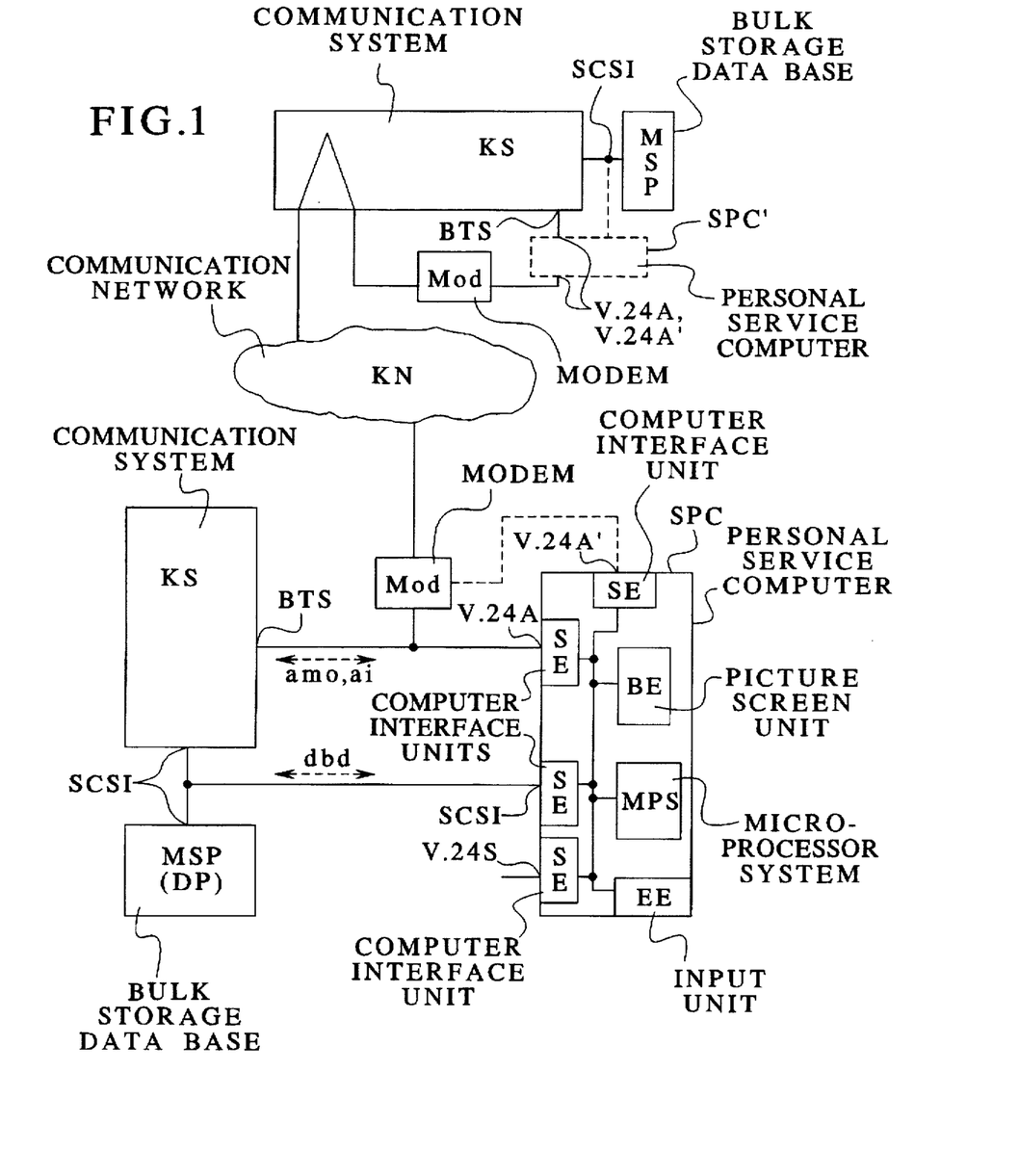
FIG. 1 shows a personal service computer and the possibilities of the connection thereof to communication systems.

FIG. 1 shows a personal service computer SPC and the connection thereof to communication systems KS to be administered or managed. The data base DB of the communication system KS is stored in connected bulk storages MSP—for example, a hard disk. For the connection of such bulk storages MSP to a communication system KS, these and the bulk storages MSP are respectively equipped with a peripheral computer interface SCSI and are connected to one another. The peripheral computer interface SCSI is advantageously realized by the standardized, peripheral computer interface "small computer system interface". The "small computer system interface" is defined in document X3T9.2 of ANSI (American National Standard Institute) and comprises eight data interface terminals for the bidirectional transmission of addresses and data as well as a data parity bit interface terminal. Another nine control terminals are provided for the control of the peripheral computer interface. For the communication of the personal service computer SPC with the bulk storage MSP of a communication system, the latter is provided with an identically realized computer interface SCSI. The realization of the procedural and physical properties of this computer interface SCSI occurs in a computer interface unit SE. The data bases DB of the communication systems can be modified, i.e. updated and data base information can be called in via this computer interface SCSI of the personal service computer SPC connected to the computer interface SCSI of the bulk storage MSP.

In a further interface unit SE, a data interface V.24A is realized with an asynchronous transfer method. The data interface V.24A is designed according to CCITT recommendation V.24. Given a local connection of the personal service computer SPC to a communication system KS, the data interface V.24A is connected to an identical administration and maintenance interface BTS of the communication system KS. The administration and maintenance instructions amo or answerbacks ai from the communication system KS are transmitted via this connection.

Given a remote operation of the personal service computer SPC, i.e. the personal service computer SPC is connected to a communication system KS via a public or private communication network KN, a modem MOD is respectively inserted for the transmission of the administration and maintenance instructions amo between the administration and maintenance interface BTS or the data interface V.24A and the communication network KN. With the assistance of this modem MOD, the digital information are converted into analog or digital signals suitable for the transmission via the respective communication network KN. The connection between the personal service computer SPC and the remote communication system KS is conducted in the remote communication system KS via subscriber terminals (not shown) and the switching network in order to avoid a separate connection to the public or private communication network KN for a remote administration and management.

As shown in FIG. 1, a further personal service computer SPC'—indicated by broken lines—can be inserted into the connection between the modem MOD and the communication system KS at the remote communication system KS. For this application, the further personal service computer SPC comprises a further data interface V.24A', whereby one of the two data interfaces V.24A, V.24A' is connected to the administration and maintenance terminal BTS and the other data interface V.24A is connected to the modem MOD. Via the further data interface V.24A of a personal service computer SPC, moreover, this can be connected to a remote communication system KS to which a personal service computer SPC is likewise allocated for the purpose of a remote administration and maintenance.

For the direct connection of the personal service computer SPC to a communication system KS, the personal service computer SPC comprises a synchronous data interface V.24S realized as an interface unit SE. This synchronous data interface V.24S is provided for the connection to administration and maintenance terminals BTS with synchronous data transmission at which, for example, a unix terminal emulation or a unix application is provided.

A personal service computer SPC further comprises a known input means EE—for example, a keyboard, a microprocessor system MPS (for example, a microprocessor system SAB 80 386 of Siemens AG), and a picture screen unit BE.

Figure 2A:
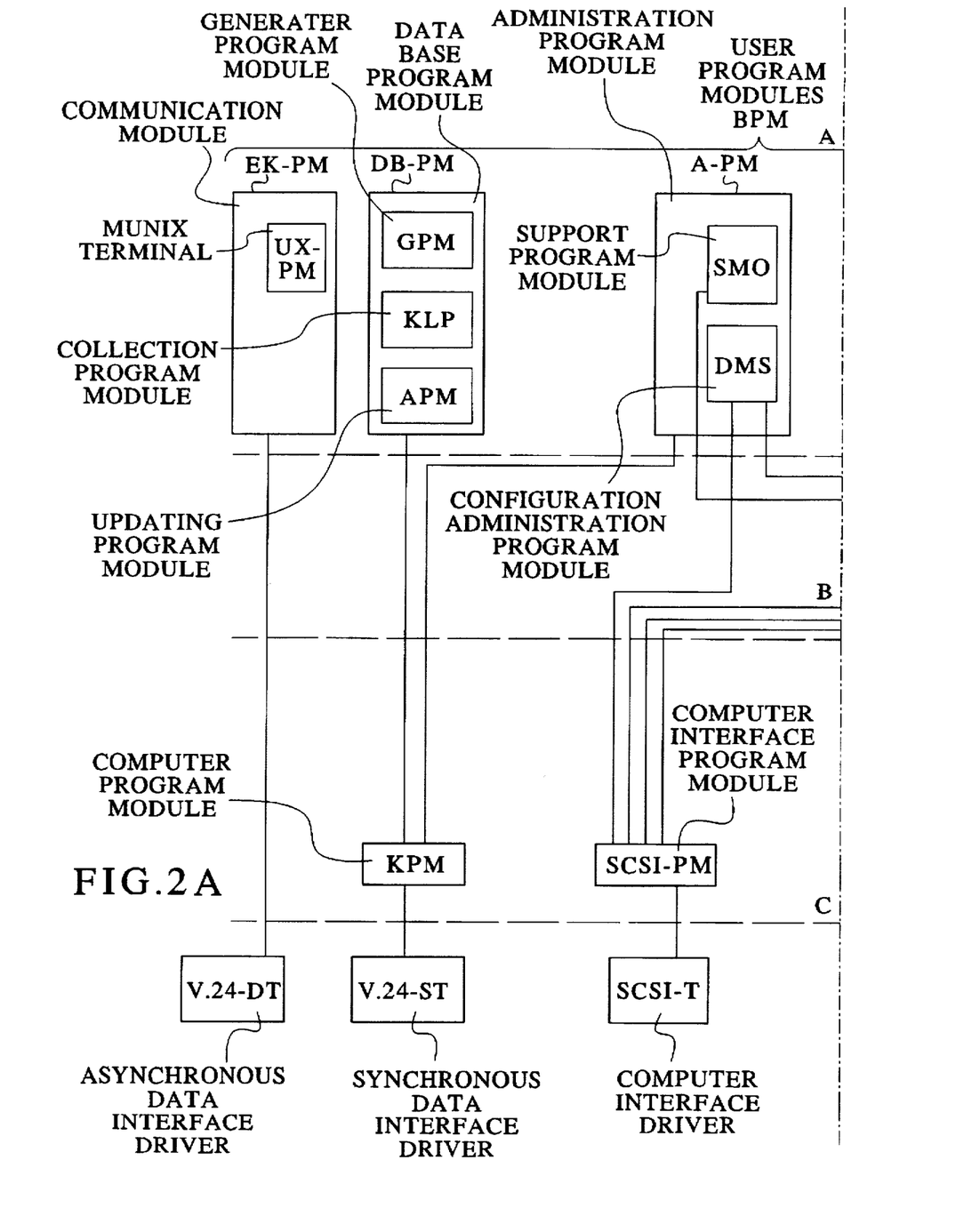
FIGS. 2A–B illustrates the software structure of the personal service computer.
Figure 2B:
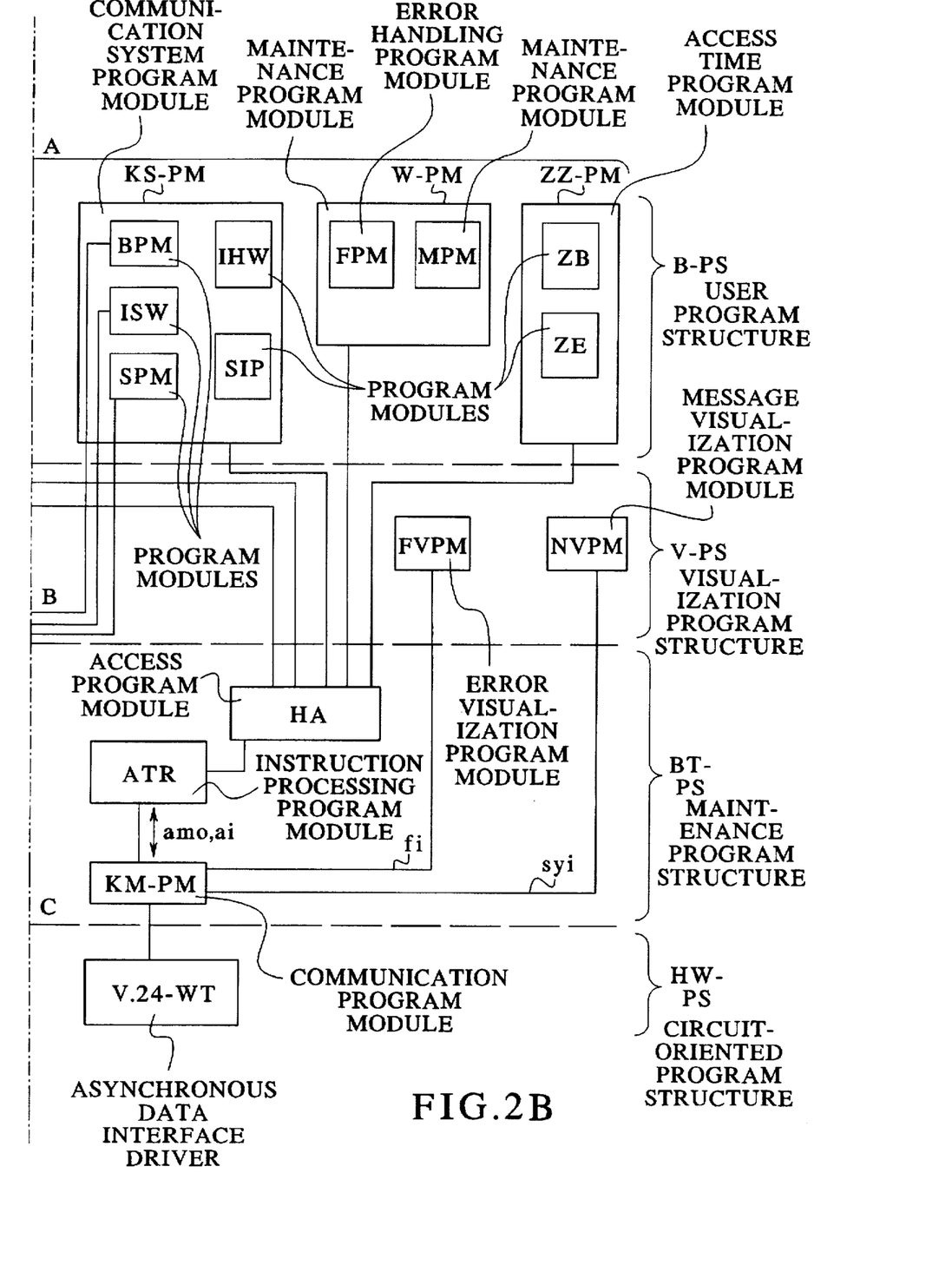

FIGS. 2A-B shows the software concept of a personal service computer SPC shown in FIG. 1. A personal computer operating system DOS and a window-oriented operating system WIN—not shown—represent the link of the software structure to the hardware. The personal computer operating system is realized, for example, by the operating system MS DOS 6.0 and the window-oriented operating system is realized, for example, by MS WINDOWS 3.1.

The software structure is basically structured in four hierarchial levels. In detail, these are the user program structure B-PS, the visualization program structure V-PS, the administration and maintenance program structure BT-PS and the circuit-oriented program structure HW-PS.

In the basic configuration, an administration program module A-PM, a communication system program module KS-PM and a maintenance program module W-PM are arranged in the user program structure B-PS. Optionally, a data base program module DB-PM, a further communication module EK-PM, as well as an access time program module ZZ-PM can be provided. The user program modules BPM of this structural level B-PS are controlled from the user surface, i.e. the initialization and control of the program modules is essentially effected by user inputs. In addition, information and message contents corresponding to the respective user program module BPM that are communicated from a communication system KS are visualized with the assistance of the respective user program module BPM and of the picture screen unit BE.

Information or parameters for administration and maintenance instructions AMO that are provided for the administration of communication systems KS are formed in the administration program module A-PM. For this purpose, the respective parameters p to be inserted into the administration and maintenance instructions amo or information are interrogated onto the control of the user surface and are forwarded on for the purpose of being inserted into administration and maintenance instructions amo. Since administrative A & M instructions amo contain, in particular, the updating or modification of the data base. The parameters p with respect thereto or information for the A & M instructions amo are formed onto the control of the user surface in a configuration administration program module DMS provided for this purpose. For support, a support program module SMO is provided with the assistance of which, in particular, a data base DB deposited in a bulk storage MSP can be updated or modified or read via the computer interface SCSI.

The communication system KS to be administered or managed is placed in operation or, respectively, installed with the assistance of the communication system program module KS-PM. For this purpose, an installation program module is respectively provided for the installation of the hardware IHW and of the software ISW. A further shell program module SPM represents a graphic personal computer/administration and maintenance interface for the control of memory means for storing data and data files. In particular, these are functions such as displaying directories of memory devices of the communication systems KS, displaying the content of data files, and copying data files.

Back up copies of the data bases DB or data base parts of the communications systems KS to be administered or managed are prepared and stored with the assistance of a back up program module BPM.

A system information program module SIM implemented in the communication system program module KS-PM visualizes information individually associated to the communication system or controls their output—for example, to a printer device. For example, these are information about the version and the registration number of a communication system, about the release of the implemented firm wear or load wear and particulars about the hardware/software configuration of the respective communication system KS.

The maintenance program module W-PM comprises an error handling program module FPM and a maintenance program module MPM. Parameters P and information for administration and maintenance instructions amo are formed with the assistance of the maintenance program module MPM. Interrogations relating to the configuration, interrogations relating to the switching-oriented status and the start of test procedures in the communication systems KS to be administered or to be managed are started with the assistance of these. Status inquiries relating to the configuration are, in particular, inquires about the number of connectable subscribers, plurality of available communication terminals, etc. Switching-oriented inquiries are represented by inquiries about the occupation and the switching-oriented statuses of communication terminals, interfaces and fee registrations.

The optional data base program module DB-PM comprises a generation program module GPM provided for forming data bases DB, a collection program module KLP that effects the collecting of data base data, and an updating program module APM that effects a data base updating of a communication system KS. These program modules GPM, KLP, APM act on a program module KPM that is arranged in the administration and maintenance program structure BT-PS and procedurally controls the synchronous data interface V.24S, whereby only data base data are communicated to the communication systems KS or from the communication systems KS via the synchronous data interface V.24S.

The procedural control of the further asynchronous data interface V.24A is assumed by the external communication program module EK-PM. For this purpose, subscriber terminals, particularly service terminal connections provided for the communication systems KS, are emulated. For example, a program module for the emulation of a munix terminal UX-PM is shown. For further emulations (for example, the emulation of a further administration and maintenance terminal or of a data processing system). Further program modules can be linked into the external communication program module EK-PM without influence on existing program modules.

An error visualization program module FVPM and a message visualization program module NVPM are respectively provided in the visualization program structure V-PS for the visualization of the errors communicated from the communication systems KS. With the assistance of these two program modules FVPM, NVPM, the errors communicated from the communication systems KS as reply information ai and system status information are visualized, i.e. displayed directly at the picture screen unit BE of the personal service computer SPC without further processing or influencing. This is required for immediate reaction after the occurrence of such messages.

The program modules that control and coordinate the personal service computer SPC are arranged in the administration and maintenance program structure BT-PS. In particular, these are the instruction processing program module ATR and the access program module HA. The instruction processing program module ATR is set forth in greater detail in FIG. 3 and the access program module HA is set forth in greater detail in FIG. 4.

Beyond this, the administration and maintenance program structure BT-PS contains a computer interface program module SCSI-PM and a communication program module KM-PM. The peripheral computer interface SCSI is procedurally controlled with the assistance of the computer interface program module SCSI-PM, i.e. the information are controlled in time-suited fashion to the respective interface lines. The information or data to be communicated to or received from the program modules are directly communicated to the user program structure B-PS or are forwarded thereto. The affected program modules DMS, ISW, BPM, SPM are indicated by connections between the computer program module SCSI-PM and the respective program modules DMS, ISW, BPM, SPM.

The information ai communicated from or to be communicated to the instruction processing program module ATR or administration and maintenance instruction amo are sent in time-suited fashion to or communicated to the asynchronous data interface V.24A with the assistance of the communication program module KP-PM. Further, error information fi and system information syi communicated from the communication systems KS are recognized in this communication program module KM-PM and are directly communicated to the error visualization program module FV-PM or to the message visualization program module NV-PM illustrated with corresponding connections.

The circuit-oriented program structure HW-PS in the basic configuration comprises an asynchronous data interface driver V.24-WT realized in a window-oriented operating system WIN as a link to the physical lines of the asynchronous data interface V.24A. In this basic configuration, an asynchronous data interface V.24A is realized with the assistance of which a personal service computer SPC can be connected to the administration and maintenance terminal BTS of a communication system KS locally directly or via a public or local communication network KN.

Optionally, a computer interface driver SCSI-T, an asynchronous data interface driver V.24-DT realized in the personal computer operating system DOS, and a synchronous data interface driver V.24-ST realized in the personal computer operating program DOS can be inserted into the circuit-oriented program structure HW-PS. The interfaces V.24A', SCSI, V.24S set forth in FIG. 1 are realized with the assistance of these interface drivers T.

Figure 3:
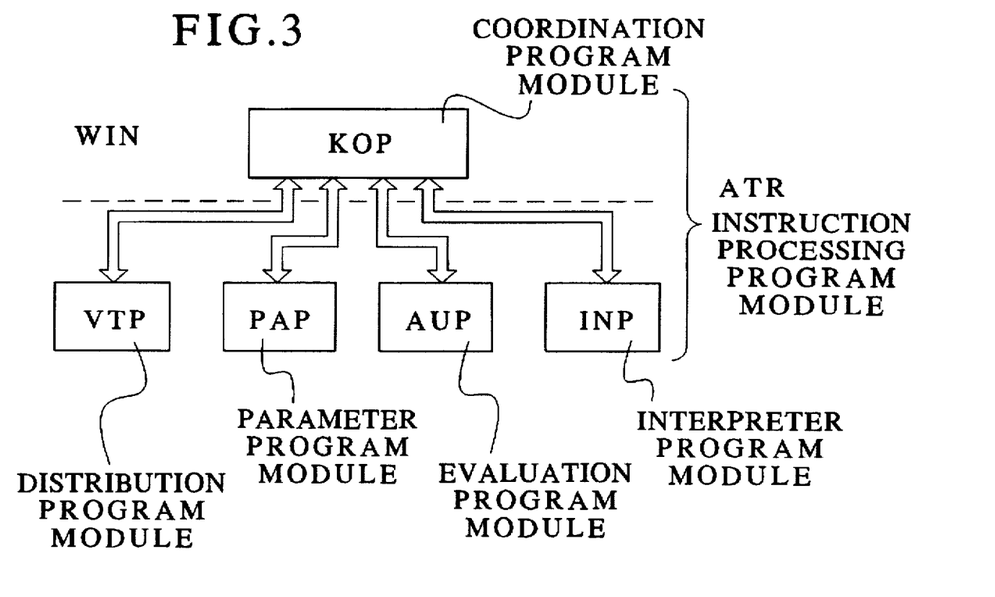
FIG. 3 illustrates the program structure of the instruction processing program module.

FIG. 3 shows the sub-program structure of the instruction processing program module ATR. A coordination program module KOP implemented in the window-oriented operating system WIN is provided for the communication of information ai or administration and maintenance instructions amo between the individual program modules. The functions of the instruction processing program module ATR are realized by a distribution program module VTP, a parameter program module PAP, an evaluation program module AUP and an interpreter program module INP. With the assistance of the distribution program module ATP, the information ai or administration and maintenance instructions amo communicated from the coordination program module KOP are evaluated or examined to see whether the information or administration and maintenance instructions amo communicated from the coordination program module KOP are to be forwarded to one of the three further program modules PAP, AUP, INP or to some other program module PM in the personal service computer. The evaluation, i.e. the identification of the designation program, is especially effected by evaluating the type of message reported in the corresponding message. Further, consistency checks of the communicated messages occur with respect to the status indicated in the messages and with respect to the type of message.

With the assistance of the parameter program module PAP, the parameter p communicated from the user program modules BPM via the coordination program module KOP are inserted into administration and maintenance instructions amo, or administration and maintenance parameters p or information ai are removed from an administration and maintenance instruction amo or information ai by one of the user program modules BPM for the purpose of a visualization and are communicated to the respective user program module BPM via the coordination program module KOP.

The evaluation program module AUP checks and evaluates information or reply information ai communicated from a communication system KS to be administered or to be managed. These information ai mainly represent a confirmation or a reaction of an administration and maintenance action or updating being initialized by a previously transmitted administration and maintenance instruction amo. The parameters p or, respectively, information ai potentially identified in this evaluation program module AUP and differing given different communication system versions are converted into a uniform user-understandable information with the assistance of an interpreter program module INP. This means that the administration and maintenance parameters p and instructions associated to the different communication systems and that are usually difficult to understand are reinterpreted into user-understandable information and are communicated via the coordination program module KOP to the respective user program module BPM and are visualized with the assistance thereof.

Figure 4:
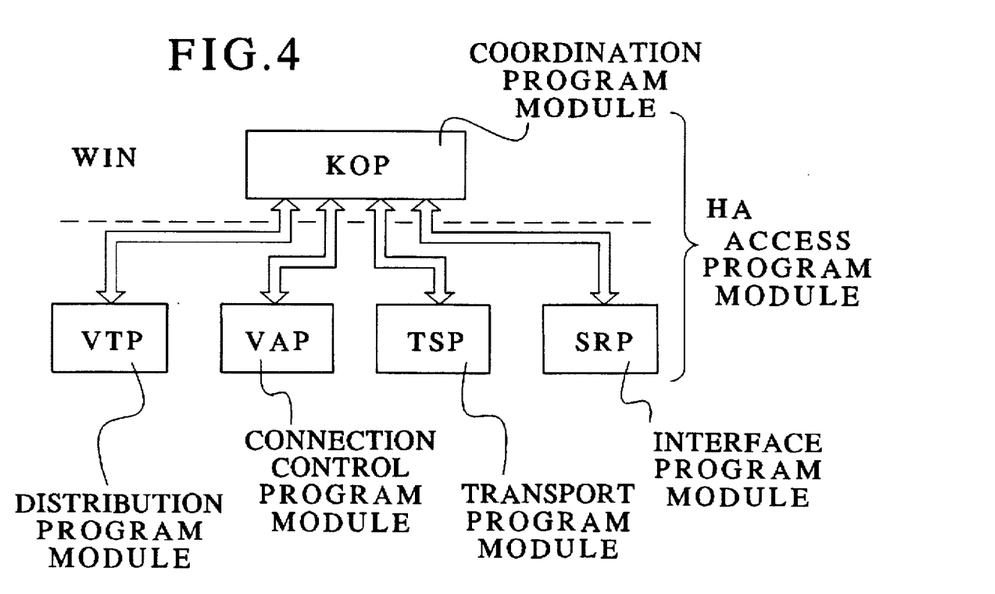
FIG. 4 shows the program structure of the access program module.

FIG. 4 shows the sub-program structure of the access program module HA. For the communication of information ai or administration and maintenance instructions amo between the individual program modules, a coordination program module KOP implemented in the window-oriented operating system WIN is provided. The functions of the access program module HA are realized by a distribution program module VTP, by a connection control program module VAP, by a transport program module TSPP, and by an interface program module SRP. With the assistance of the distribution program module VTP, the information ai or the administration and maintenance instructions amo communicated from the coordination program module KOP are evaluated or investigated to see whether the information or administration and maintenance instructions amo communicated from the coordination program module KOP are to be communicated to one of the three other program modules VAP, TSP, SRP or to some other program module PM in the personal service computer SPC. The evaluation or the identification of the destination program is especially effected by evaluating the message type that is indicated in the corresponding message. Further, consistency checks of the communicated messages are performed with respect to the statuses recited in the messages regarding the type of message.

A connection to the connected communication system KS is set up, monitored and cleared down with the assistance of the connection control program module VAP for the purpose of administration and maintenance, whereby the switching-oriented functions for the call set up and clear down are particularly realized in the connection control program module VAP. With the assistance of the transport program module, the switching-oriented information and the further information to be communicated are inserted into or removed from messages provided for the communication exchange with the connected communication system KS, and are communicated to or received by the interface program module SRP that procedurally controls the interface V.24A.

Figure 5:
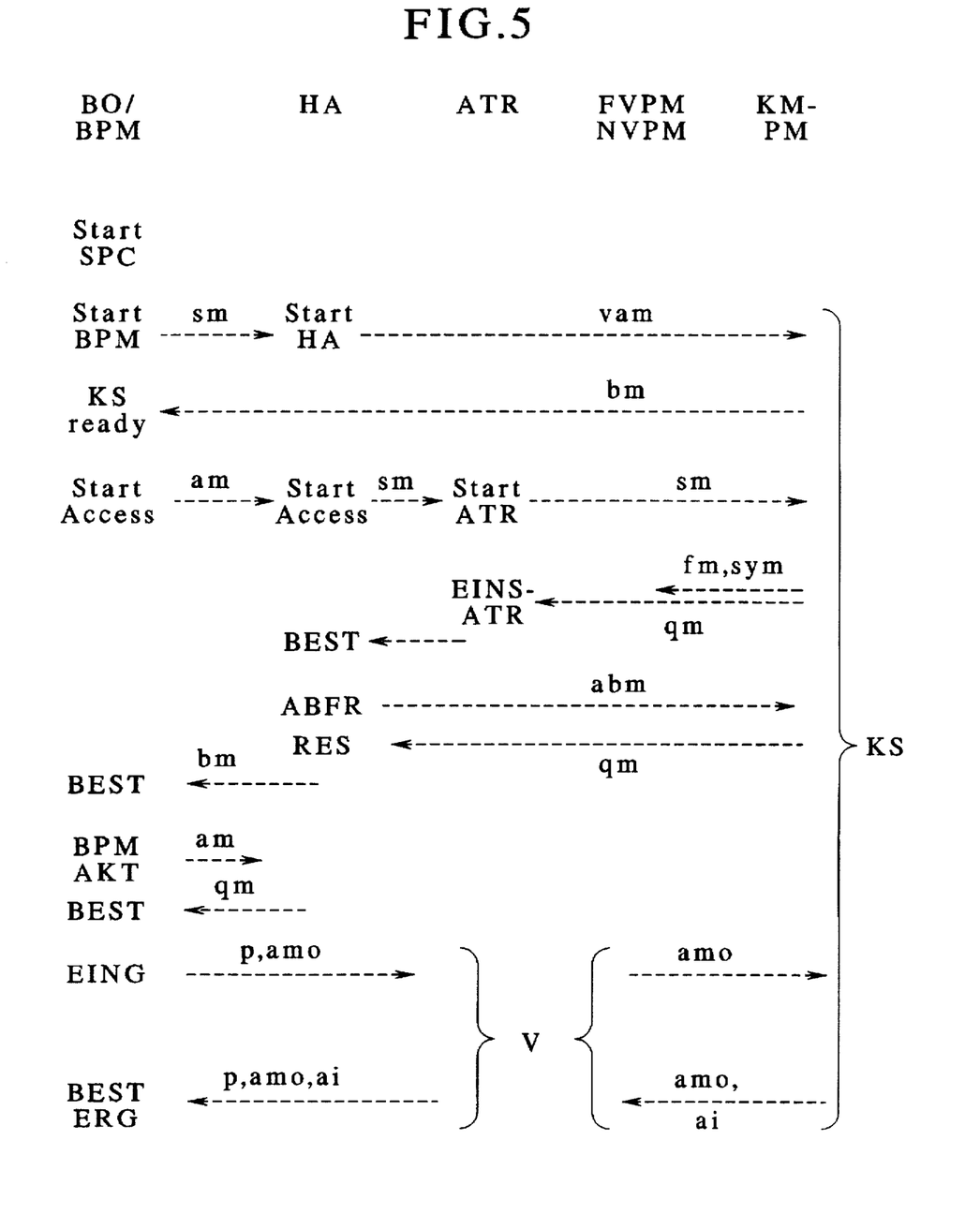
FIG. 5 is a message flowchart for a communication relationship between a communication system and a locally connected personal service computer.

In a message flowchart, FIG. 5 shows the message flow between the program modules arranged in the program structures in a personal service computer SPC that is locally connected to the service interface BTS of a communication system KS, by way of example. The upper area of FIG. 5 indicates program modules to which the column respectively lying therebelow is allocated. The first column is allocated to the user surface BO of the respective user program modules BPM arranged in the user program structure B-PS. Furthermore, a respective column is provided for the access program module ATR, instruction processing program module ATR, the communication program module KM-PM and for the error visualization program module FV-PM and the message visualization program module NV-PM. After the commissioning of a personal service computer SPC, for example, a group of callable programs or functions is displayed on the graphic surface BO thereof. Given the graphic surface BO of a window-oriented operating system WIN, the individual programs or functions are graphically displayed by icons, whereby the functions of the personal service computer SPC are called in by clicking to an icon representing the personal service computer functions. This call-in is indicated in FIG. 5 with the designation "start SPC". Thereafter, user program modules BPM of the user program structure B-PS that can be called in are displayed, for example with icons, on the graphic surface BO of the window-oriented operating system WIN. The start of one of the user program modules BPM is likewise effected by clicking to the corresponding icon and is shown in FIG. 5 by indicating the information "start BPM". A start message sm is communicated to the access program module HA by the respective user program module BPM, whereupon this is started—see FIG. 5—, with the indication "start HA". A call set up message vam is automatically formed with the assistance of the access program module HA and is communicated to the connected communication system KS via the activated instruction processing program module ATR and the communication program module KM-PM. An acknowledge message bm is communicated from the communication system KS via the two afore-mentioned program modules ATR, KM-PM and is displayed at the surface BO of the currently started user program module BPM. The display is indicated by the particular "KS ready". Only the readiness for an information communication of the communication system KS is confirmed by this indication.

On the basis of a corresponding input—see FIG. 5, the particular "Start access"—the administration and maintenance access to the communication system KS to be administered or to be managed is subsequently started. For this purpose, a log on message am is formed in the respective user program module BPM and is transferred to the access program module HA. The corresponding access routines are started therein and a start message sm is formed and is forwarded to the instruction-processing program module ATR and to the communication system KS. The start message SM effects the start of the instruction-processing program module ATR—see FIG. 5, "Start ATR". Analogous thereto, error messages or system messages fm, sym potentially existing in the communication system KS are automatically interrogated and communicated to the error visualization and message visualization program modules FV-PM, NV-PM for the purpose of a visualization at the user surface BO of the personal service computer SPC. Parallel thereto, the information about the communication language, the nature, the type and the configuration level are automatically interrogated, inserted into an acknowledge message qm and transferred to the instruction-processing program module ATR. On the basis of this communication, corresponding settings are undertaken in the instruction-processing program module ATR—see FIG. 5, "EINS-ATR". The settings especially refer to a communication language to be employed, to the currently employable administration and maintenance instructions amo and to the embodiments of the stacks of administration and maintenance instructions amo individually associated to a communication system. Further information that are required for the setting of the instruction-processing program module ATR are interrogated by corresponding interrogate messages abm and acknowledge messages qm. The formation and evaluation of these messages ABM, QM are indicated in FIG. 4 by the designations ABFR and RES.

After the setting of the instruction-processing program module HA, this forms an acknowledge message bm and communicates this to the currently active user program module BPM, at which it is displayed—see FIG. 5, "BEST". After this acknowledge, which indicates the access readiness of the communication system KS, the execution of the user program module BPM—for example, of the administration program module A-PM—can be activated by an appropriate input—see FIG. 5, "BPM AKT". Within the framework of the activation, a log-on message am is formed and communicated to the access program module HA. A determination is made therein as to whether a processing of the user program module BPM is possible by the instruction-processing module ATR or the communication program module KM-PM and, dependent on the result of this determination, an acknowledge message qm is communicated to the user program module BPM or the surface BO thereof—see FIG. 5, "BEST". Given a positive acknowledge, parameters p or administration and maintenance instructions amo are input in accordance with the activated user program module BPM via the user surface BO thereof or are formed in this user program module BPM—see FIG. 5, "EING"—or are called in and communicated to the instruction-processing module ATR via the access program module HA. The insertion of the parameters p interrogated or formed in the updated user program module BPM into administration and maintenance instructions amo occurs in this instruction-processing program module ATR. Individual administration and maintenance instructions amo that are stored or formed, or administration and maintenance instructions amo or stacks of such administration and maintenance instructions amo communicated from the user program modules BPM are successively processed. This means that administration and maintenance instruction AMO for administration and maintenance instruction amo is successively sent to the communication system KS to be administered or managed, the corresponding administrative or management action is performed thereat and the results of the execution are returned to the personal service computer SPC by further administration and maintenance instructions amo or by reply information or information ai. The instruction-processing program module ATR comprises an evaluation of the received administration and maintenance instructions amo or reply information ai and initiates a visualization—see FIG. 5, "BEST ERG"—as well as corresponding reactions that are controlled via the respective user surface BO dependent on the activated user program module BPM. The respective versions of the processing of administration and maintenance instructions amo or information in the instruction-processing program module ATR are indicated in FIG. 5 by the designation VA. Provided as a reaction for a comfortable operation of the personal service computer SPC are an automatic call-in and, potentially, formation of an administration and maintenance instruction amo, a previously running, user-surface-controlled operation being continued by the user program modules BPM after the communication and execution thereof in the respective communication system KS. Parameters p that may be required and which cannot be automatically identified can be potentially called in by surface-controlled inputs with the assistance of the relevant, automatically activated user program module BPM.

The personal service computer SPC represents the portable administration and maintenance terminal that, given maximum operating ease, enables a local and remote-control administration and maintenance of different communication systems KS having different configuration levels. This means a substantial reduction in the types of service terminals required and, on the basis of its modular system design, assures a flexible matching with respect to the administration or management of future communication system KS.

Although various minor changes and modifications might be proposed by those skilled in the art, it will be understood that we wish to include within the claims of the patent warranted hereon all such changes and modifications as reasonably come within our contribution to the art.

We claim as our invention:

1. A system for administering and maintaining a plurality of communication systems, comprising:

a plurality of communication systems;

a personal service computer connected to the communication systems, said personal service computer having a personal computer operating system, a window-oriented operating system, and a program structure for administering and maintaining by administration and maintenance instructions containing administration and maintenance parameters said program structure comprising a user, visualization, an administration and maintenance, and a circuit-oriented program structure;

said user program structure being formed by user program modules for generating and visualizing administration and maintenance parameters initializable and controllable by a user surface as well as administration and maintenance instructions, and for also initializing and controlling communication to and from a communication system;

said visualization program structure being formed by program modules for displaying communication system errors and messages;

said administration and maintenance program structure comprising:

an instruction-processing program module designed such that administration and maintenance parameters communicated from the user program modules are inserted into administration and maintenance instructions and administration and maintenance parameters and information can be read from the administration and maintenance instructions communicated from the communication systems and can be transferred to the user program modules, such that communication of every administration and maintenance instruction to and from the communication system is controlled and monitored, and such that an administration and maintenance information received from a communication system as a reaction to an administration and maintenance instruction that was transmitted is evaluated and a corresponding or no corresponding administration and maintenance reaction is initiated dependent on informational content, an access program module for controlling and monitoring the communication with the communication system via a communication interface, and a communication interface program module realized in the window-oriented operating system for procedurally controlling the communication interface; and said circuit-oriented program structure having at least one asynchronous communication interface driver realized in at least one of the window-oriented operating system and the personal computer operating system.

2. A system according to claim 1 wherein the instruction-processing program module is designed such that administration and maintenance instructions combined to form job-related stacks individually associated to the communication system are successively communicated to the communication system.

3. A system according to claim 1 wherein at least one user program module is designed such that administration and maintenance instructions provided with administration and maintenance parameters or job-related stacks of administration and maintenance instructions are formed under control of the user surface and are transferred to the instruction-processing program module for a forwarding to the communication system.

4. A system according to one of the claim 1 wherein the user program structure comprises:

an administration program module for effecting a user-surface-controlled interrogation of administration and maintenance parameters for administrative functions in the communication systems and for providing administration and maintenance instructions, a maintenance program module for effecting the user-surface-controlled interrogation of administration and maintenance parameters for maintenance functions in the communication system and for providing administration and maintenance instructions, and a communication system program module for commissioning the user-surface-controlled interrogation of administration and maintenance parameters for the communication system for securing communication system data, for influencing communication system data stores and datafiles, and for providing administration and maintenance instructions.

5. A system according to claim 4 wherein a database program module for generating or updating a database of the communication system or collecting database data is provided in the user program structure.

6. A system according to claim 4 wherein an external communication program module for controlling a further external communication interface for coupling of personal service computers and for connection of data processing systems is provided in the user program structure.

7. A system according to claim 4 wherein a help program module for visualizing user help information is provided in the user program structure.

8. A system according to claim 1 wherein a computer interface program module for procedurally controlling an additional peripheral computer interface is provided in the administration and maintenance program structure.

9. A system according to claim I wherein a communication program module realized in the personal computer operating system for procedurally controlling a synchronous communication interface is provided in the administration and maintenance program structure.

10. A system according to claim 1 wherein a synchronous communication interface drive realized in the personal computer operating system is provided in the circuit-oriented program structure.

11. A system according to claim 1 wherein a computer interface driver realized in the personal computer operating system is provided in the circuit-oriented program structure.

12. A system according to claim 1 wherein at least one asynchronous communication interfaces realized in the window-oriented operating system and a further asynchronous communication interface is realized in the personal computer operating system.

13. A system according to claim 1 wherein the personal service computer has a computer interface for connection of peripheral personal computer equipment.

14. A system according to claim 1 wherein the personal service computer has a further synchronous communication interface for communication of bulk data from and to the communication systems.

15. A system for administering and maintaining communication systems, comprising:

a variety of communication systems having a variety of configuration levels and function versions;

a personal service computer directly connected to each of the communication systems; each personal service computer having a program structure for generating administration and maintenance instructions individually associated to the communication systems and for communicating those administration and maintenance instructions to the respective communication system to which it is directly connected and also to remote communication systems via the communication system to which it is directly connected;

the program structure having four program structures that are modifiable by removing or adding program modules; and said four program structures comprising a user program structure for generating and visualizing the administration and maintenance instructions and administration and maintenance parameters, a visualization program structure for displaying communication system errors and messages, an administration and maintenance program structure for inserting the administration and maintenance parameters into the administration and maintenance instructions, and a circuit-oriented program structure having at least one asynchronous communication interface driver realized in at least one of a window-oriented operating system and a personal computer operating system of the personal service computer.

\* \* \* \* \*